May 15, 1928.
H. D. STEVENS
CUTTER
Filed April 15, 1925        5 Sheets-Sheet 4
1,670,171
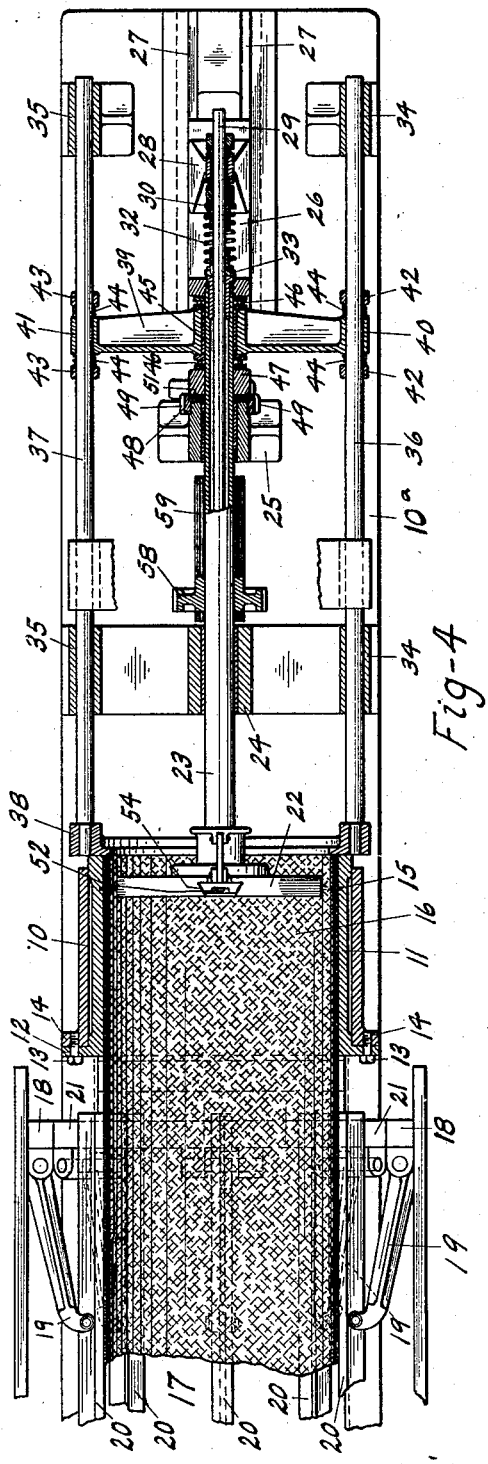
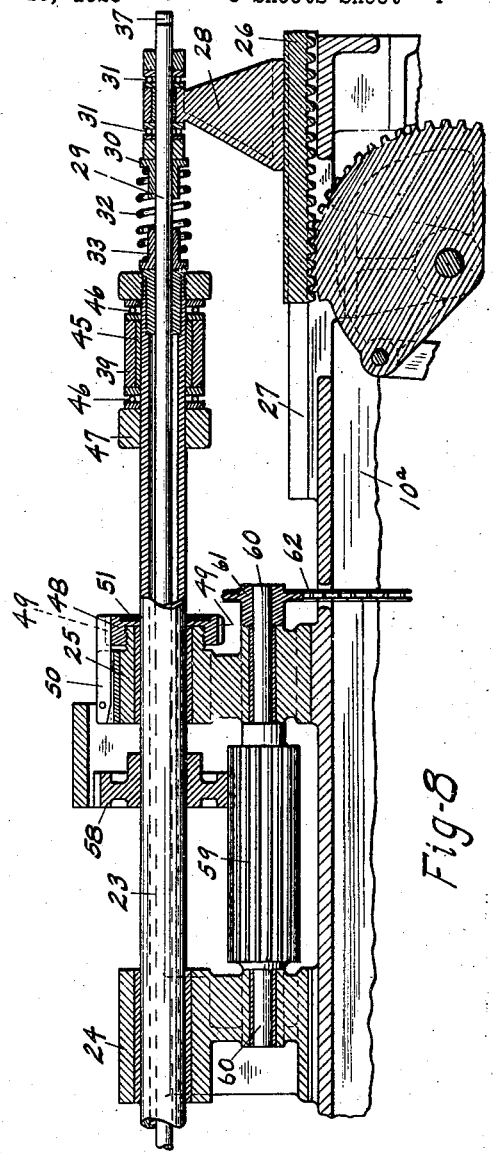
INVENTOR.
Horace D. Stevens
BY
ATTORNEY.

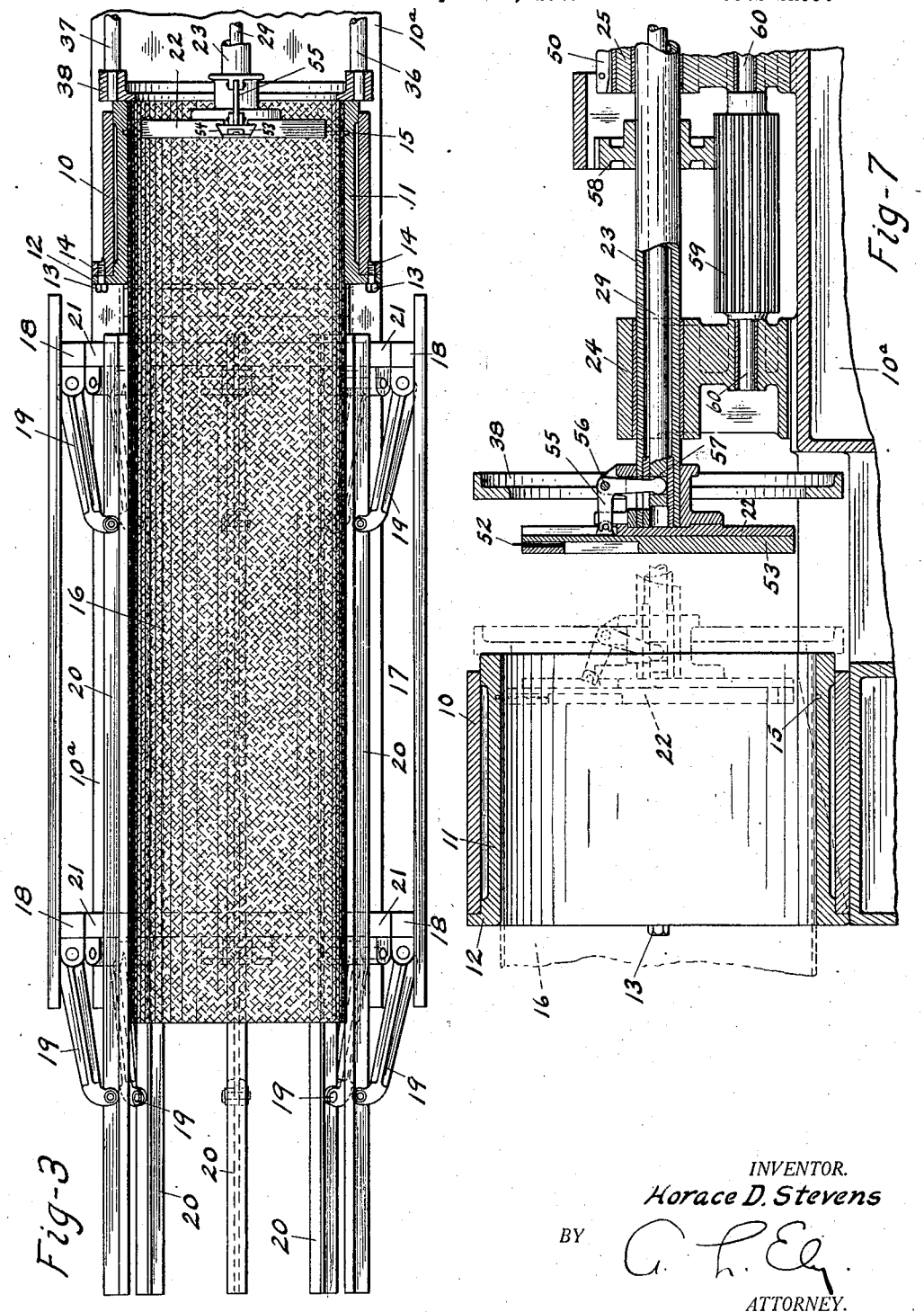

May 15, 1928.
H. D. STEVENS
1,670,171
CUTTER
Filed April 15, 1925     5 Sheets-Sheet 5
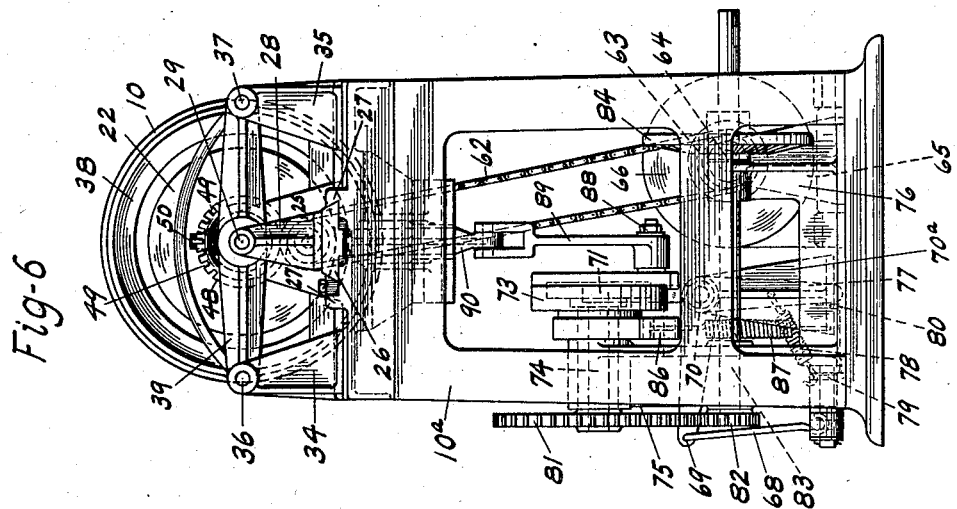
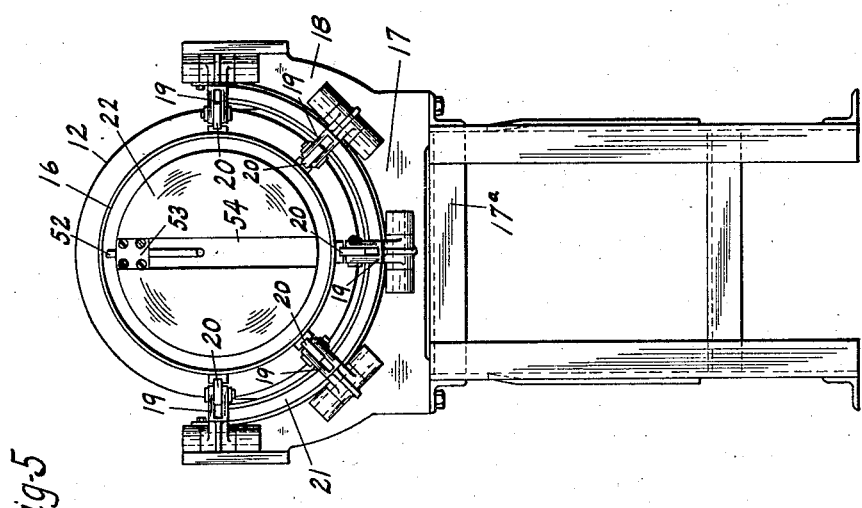
INVENTOR.
Horace L Stevens
BY
G. L. Ely
ATTORNEY.

Patented May 15, 1928.

1,670,171

UNITED STATES PATENT OFFICE.

HORACE D. STEVENS, OF AKRON, OHIO, ASSIGNOR TO THE FIRESTONE TIRE AND RUBBER COMPANY, OF AKRON, OHIO, A CORPORATION OF OHIO.

CUTTER.

Application filed April 15, 1925. Serial No. 23,258.

This invention relates to cutters and particularly to cutters for use in cutting hollow cylindrical objects such as cylinders of rubberized fabric, into sections, such as in the specific case mentioned will provide fan-belts.

The object of the invention in general is provide an improved machine of the type disclosed in the co-pending application of Edward D. Putt and H. D. Stevens, Serial No. 629,347, filed April 2, 1923.

In particular an object is to provide a machine capable of adjustment to be used for cutting cylinders of various diameters and of various widths of cuts to form various sizes of fan-belts.

Another object is to provide a common power means for reciprocating the cutter head and cooperating parts and for driving the cutter whereby they will be more effectively and cheaply driven.

Other objects are to provide an improved cutter head and mounting therefor and an improved cutter operating mechanism.

The foregoing and other objects are obtained by the construction illustrated in the accompanying drawings and described in detail below. It is to be understood that the invention is not limited to the specific construction shown and described.

Of the accompanying drawings,

Figure 3 is a plan of the cutter outfit as shown in Figure 1;

Figure 4 is a plan of the cutter outfit as shown in Figure 2;

Figure 5 is a left end view of the cradle and support as shown in Figure 1;

Figure 6 is a right end view of the cutter device as shown in Figure 2;

Figure 7 is a detail vertical section of the cutter drum and cutter head; and

Figure 8 is a detail vertical section of a portion of the cutter head operating mechanism.

Figure 1:
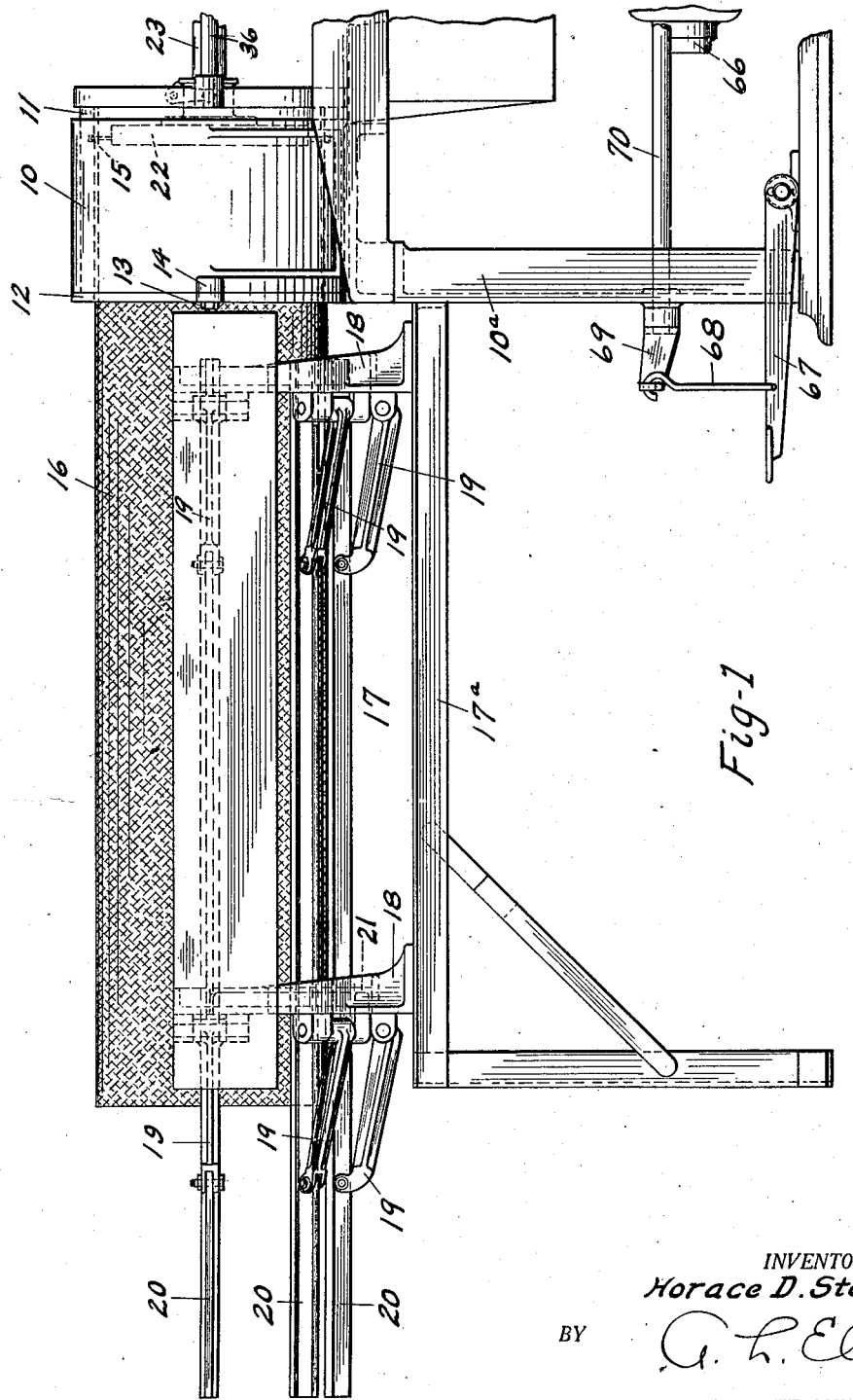
Figure 1 illustrates a side elevation of the feeding cradle from which the cylinder is fed into the cutting drum on the cutter device, a portion of the latter being also shown.

Referring to the drawings, 10 indicates a hollow cylindrical receiver mounted on a table 10ª and adapted removably to support therein hollow cylindrical cutter drums of different sizes, one of which is shown at 11 and each of which is formed with a vertical end flange 12 through which extend cap-screws 13, 13 whereby the drums may be secured in the receiver 10 by engagement of the cap screws in correspondingly threaded apertures in lugs 14 on one end of receiver 10. Each drum 11 is formed with a circumferential groove 15 on its inner surface adjacent the end into which the cutter is inserted, as will later appear, the distance of said groove from the end of the drum being the width of the desired fan-belt made by the use of that particular drum.

The cylinder of fabric which is to be cut into fan-belts is indicated at 16 and is fed into drum 11 by hand, the interior of drum 11 being of a diameter substantially equal to that of the exterior of the cylinder of fabric 16. For properly guiding the cylinder 16 into the drum, an adjustable cradle indicated generally by the numeral 17 is provided. The cradle 17 includes spaced arc-shaped supporting members 18, 18 mounted on a table 17ª and each having pivoted on one side thereof a semi-circumferential series of links 19, 19 of equal length which are connected in spaced pairs to a circumferential series of supporting bars 20, 20, which are accordingly adapted to be arranged in parallel circumferential relation to center a cylinder 16 in alignment with a drum 11. For supporting the bars 20 in place for the largest sizes of fan-belts, they may rest directly on supports 18. For smaller sizes, separate supporting segments indicated at 21 (best shown in Figure 5) of the required internal diameter to support the bars in proper relation for feeding a smaller cylinder, such as 16, may be mounted in one cradle member 18 so that bars 20 will rest thereon.

Figure 2:
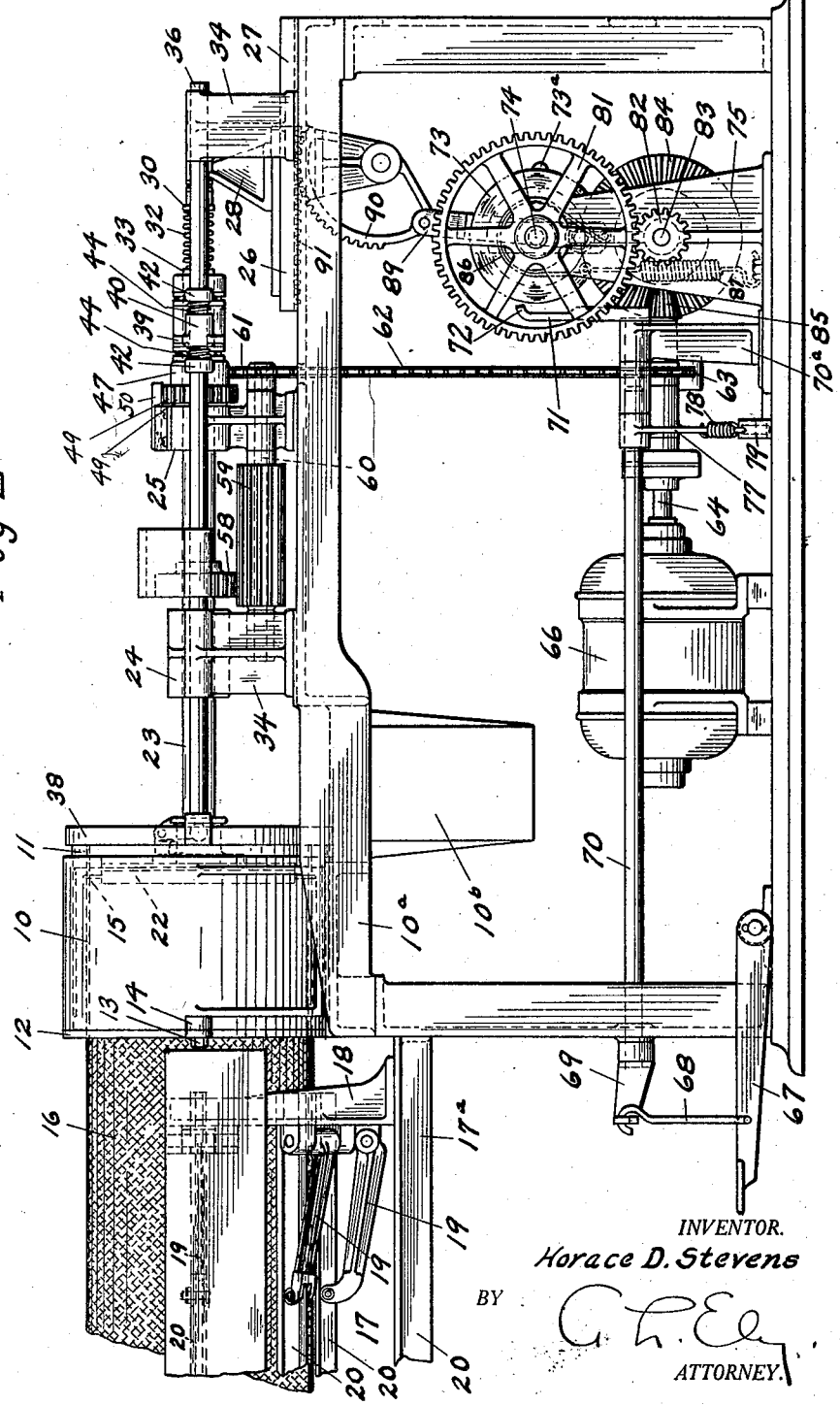
Figure 2 illustrates a side elevation of the cutter device, a portion of the feeding cradle being shown.

The cutter includes a head 22 movable into the right end of drum 11 (Figures 2, 4 and 7) by being carried on a hollow shaft 23 journaled in bearing brackets 24 and 25 on table 10ª and shiftable therein. For shifting shaft 23, a reciprocable slide 26 slidable on guides 27, 27 on table 10ª is provided, the slide 26 having a bracket 28 thereon in which is shiftably mounted the knife operating shaft 29, later to be described, which acts also as a guide for bracket 28. Mounted on shaft 29 and rotatable with respect to bracket 28 is a thrust collar 30 shiftable by bracket 28 and connected thereto by thrust ball-bearings 31, 31. A compressive spring 32 encircling shaft 29 abuts collar 30 and a second thrust collar 33 connected onto the right end of hollow shaft 23 which is thus yieldingly connected to bracket 28.

Reciprocable in bearing brackets 34, 34 and 35, 35 on table 10ª are respectively mounted rods 36 and 37 connected to a combined gage and stop ring 38 movable with the cutter head toward and from the drum 11, the cutter head being capable of determinate relative movement with respect to the ring 38 when the latter engages to the end of the drum 11 to define the desired width of cut. The rods 36 and 37 are yieldingly connected to a cross-head 39, embracing said rods 36 and 37 at 40 and 41, by having collars 42, 42 and 43, 43 secured on said rods on each side of the portions 40 and 41 and spaced therefrom and by having springs 44, 44 between said collars and said cross-head. Cross-head 39 is connected to hollow shaft 23 by having a bearing 45 through which said shaft extends and by providing on said shaft thrust ball-bearings 46, 46 whereby shaft 23 may rotate relative to cross-head 39 and at the same time may be employed to shift said cross-head when said shaft is shifted by slide 26.

An abutment collar 47 is mounted on shaft 23 so as to limit movement thereof and also movement of cutter head 22 and ring 38 by engagement with an adjustable abutment member 48 threaded onto stationary bracket 25 on table 10ª. The member 48 has a series of slots 49, 49 in its periphery arranged for receiving a latch 50 pivoted onto bracket 25 and adapted to hold member 48 in adjusted positions. The abutment face of member 48 is preferably provided with a disc 51 of yielding wear-resisting material such as fiber. Member 48 will thus determinately and positively define the distance, and the cutter head 22 will enter the drum 11 the fabric cylinder being positioned flush with the right edge of drum 11 by ring 38, any discrepancy between the spacing of ring 38 with respect to the cutter head 22 being cared for by springs 44 permitting ring 38 to yield with respect to cross-head 39 when the ring engages the right edge of drum 11.

The cutter head 22 has a knife 52 therein arranged to be radially movable so as to be retracted away from the surface of the drum 11 during movement of head 22 but to be actuated outwardly to cut the fabric cylinder against the drum when head 22 is positioned properly within the drum. The knife 52 accordingly is preferably carried by a slide 53 dove-tailed into a radial guide groove 54 formed in head 22. The slide 53 has connected thereto one end of a bell-crank lever 55 pivoted at 56 on head 22 and having its other end engaged in a slot 57 in shiftable shaft 29 which extends through shaft 23 to adjacent head 22 due to the non-shiftable but rotatable mounting of shaft 29 in bracket 28 and the yielding connection between the latter and shaft 23, shaft 29 is adapted to be shifted by bracket 28 relatively to shaft 23 after the latter is stopped by abutment 48 to operate bell-crank lever 55 to move knife 52 radially outwardly in head 22.

For continuously rotating head 22, shaft 23 and shaft 29, both when in non-cutting or cutting positions or while shifted, a gear 58 is secured on shaft 23 and is meshed with a long gear 59 along which gear 58 may slide, the gear 59 being secured on a shaft 60 journaled in brackets 24 and 25 and driven by a sprocket 61 over which is trained a chain 62 which latter is driven by a sprocket 63 on a drive shaft 64. Shaft 64 is journaled in a bearing bracket 65 and may be driven by a motor 66.

It is desirable that the reciprocation of the cutter head 22 be controlled manually and to this end a clutch-operating pedal 67 is pivoted adjacent the left end of table 10ª so that pedal 67 will be disposed adjacent the feed side of drum 11, pedal 67 is connected by a link 68 to a crank 69 on a rock shaft 70 journaled in table 10ª and bracket 70ª. Shaft 70 has thereon an arm 71 formed with an off-set 72 adapted to control the operation of a suitable type of single-revolution clutch which, as here shown, includes a rotatable drum 73 on a shaft 74 which is journaled in bracket 75, said drum having the usual dog 73ª therein and projecting therefrom into the path of which off-set 72 of arm 71 is normally held by means of an arm 77 secured on shaft 70 and connected by a spring 78 to a bracket 79 which is formed with a stop portion 80 for limiting action of said spring on said arm. Depression of pedal 67 is adapted to rock shaft 70 against the action of spring 78 to move off-set portion 72 of arm 71 to one side of the dog to permit rotation of drum 73 and shaft 74. Shaft 74 is driven by a gear 81 meshed with a pinion 82 on a shaft 83 journaled in brackets 75 and 76. Shaft 83 is driven by a bevel gear 84 with which is meshed a bevel pinion 85 on shaft 64. A brake band 86 is tensioned about drum 73 by a spring 87 so as to retard rotation of the drum and stop it immediately upon disengagement of drum 73 from the shaft. An adjustable crank pin 88 is connected to the drum 73 and operates a pitman 89 connected to a rockable sector gear 90 mounted on table 10ª. Sector gear 90 meshes with a rack 91 formed on the under surface of slide 26 whereby rotation of drum 73 is effective to reciprocate cutter head 22, the single-revolution clutch being adapted to stop movement of slide 26 no matter when pedal 67 is released only when the cutter is at its extreme right-hand position away from the drum 11.

The operation of the device which will be apparent from the foregoing may be briefly described as follows:

The cylinder 16 is mounted on the properly adjusted cradle bars 20, the proper size of drum 11 being mounted in receiver 10. Motor 66 is continuously driven and accordingly continuously rotates cutter head 22 and also shaft 74. The cylinder 16 is now manually fed through drum 11 until its right end projects therefrom. Pedal 67 is now depressed thus effecting rotation of drum 73 and reciprocating movement of slide 26.

As the cutter head 22 moves into drum 11, ring 38 engages the projecting end of cylinder 16 and pushes the cylinder to the left until the ring 38 engages drum 11 thus positioning said end of cylinder 16 flush with the right edge of drum 11. Collar 47 at this time engages abutment 48 and prevents further movement of shaft 23, spring 32 accordingly being placed under compression by continued movement of slide 26. The head 22 is thus positioned for cutting a belt of the desired width. Continued movement of slide 26 to the left causes shaft 29 to shift to the left relatively to shaft 23 and actuates bellcrank lever 55 to force knife 52 outwardly into the cylinder 16 which it cuts as will be apparent. As slide 26 is thus drawn to the right away from claim 11, shaft 29 is first shifted to the right to withdraw knife 52 from engagement with the drum 11, and as soon as the compression in spring 32 is relieved, the shaft 23 is shifted to the right by continued movement of slide 26 and cutter head 22 and ring 38 are moved away from drum 11. The operator then feeds the cylinder 16 to the right through drum 11 to again cause its right end to project therefrom and by such action forces the finished belt from drum 11 into a chute 10$^b$ mounted on table 10$^a$ so as to receive them therefrom and conduct them to a receptacle, traveling conveyor or the like (not shown). The foregoing operations are repeated as will be understood until the entire length of cylinder 16 has been cut into belts, fresh cylinders 16 being mounted in the cradle 17 as each cylinder 16 is used up.

Modifications of the invention may be resorted to without departing from the spirit thereof or the scope of the appended claims.

What is claimed is:

1. In a machine for cutting belts or the like, a holder for slidably supporting an uncut cylinder, a reciprocating carriage movable toward and from the holder, a rotary knife supported on said carriage, and common driving means for operating said carriage and rotating said knife.

2. In a machine for cutting belts or the like, a holder for slidably supporting an uncut cylinder, a knife carriage, a rotary knife supported on the carriage, means to cause the holder and carriage to approach one another, and common driving means for rotating the cutter and effecting relative movement of said holder and carriage.

3. In a machine for cutting belts or the like, a holder for slidably supporting exteriorly an uncut cylinder, a knife carriage, a knife supported on said carriage so as to be radially movable within the cylinder, means for moving the knife in a circular path, means for projecting the knife into the cylinder, and common driving means for operating both of said means.

4. In a machine for cutting belts or the like, a holder for slidably supporting an uncut cylinder, a knife carriage, a knife supported on said carriage interiorly of the cylinder, means for moving the knife in a circular path, means for projecting the knife outwardly into the cylinder, and common driving means for operating both of said means.

5. In a machine for cutting belts or the like, a holder for slidably supporting an uncut cylinder, a knife carriage movable toward and from said holder, a knife supported on said carriage and normally positioned interiorly of the cylinder, means for projecting the knife outwardly of the carriage, means for moving the knife in a circular path, and common driving means for moving said carriage, for projecting said knife outwardly of the carriage and for moving the knife in the circular path.

6. In a machine for cutting belts or the like, a support for slidably mounting a cylinder of material, a knife carriage movable toward and from said cylinder, a continuously rotated head on said carriage, a knife on said head, and means for moving the knife radially of the head, and a single driving means for operating the carriage, rotating the head and moving the knife radially of the head.

7. In a machine for cutting fan belts or the like, a support for slidably mounting a cylinder of material, a knife carriage movable toward and from said cylinder, a stop for said carriage, a continuously rotated head on said carriage, a knife movable radially of the head, and a single operative means to rotate the head, to move the carriage until arrested by the stop and then to move the knife radially of the head.

8. In a machine for cutting fan belts or the like, a support for a cylinder of material, and a continuously rotating knife carrier movable axially while rotating, a knife in said carrier, said knife being movable radially of the cylinder, and a single driving means for imparting said rotary and axial movements to the carrier and radial movement to said knife.

9. In a machine for cutting cylinders, a receiver for cylinder-supporting drums of various sizes in combination with a cylinder supporting device for guiding a cylinder into a drum in said receiver, said device being adjustable to engage and guide cylinders of various sizes.

10. In a machine for cutting cylinders, a support including a circumferential series of members for supporting a cylinder so as to be fed axially, said members being adjustable to circumferential positions of various radiuses.

11. A rotary cutter including a rotary shaft, a cutter head on the shaft, a cutter radially movable on the head, an element shiftable relatively to the shaft for radially moving the cutter, means for shifting the shaft and means for continuously driving the shaft.

12. A rotary cutter including a drum, a rotary shaft, a cutter head thereon, a cutter radially movable on the head, means for shifting the shaft to move the cutter head into or out of the drum, means for continuously rotating the shaft, and means for radially moving said cutter, said first means being adapted to be rendered inoperative only when said head is out of said drum.

13. In a machine for cutting belts or the like, a cylinder for exteriorly supporting a cylinder of material, a continuously rotating knife head movable on the axis of the cylinder, a stop to limit the movement of the head in a position within the cylinder, said last means being adapted only to be operative when said head is in said drum, a knife radially movable of the head, and means to retain the knife in a position within the head and to project it outwardly of the head after axial movement thereof has been arrested.

14. A rotary cutter including a drum, a rotary cutter head movable into or out of said drum, a knife radially movable on said head, power means for moving said head into and out of said drum, and means between said power means and said head adapted to render said power means inoperative only when said head is out of said drum.

15. A rotary cutter including a drum, a rotary cutter head reciprocable into or out of the drum, a radially movable knife on said head, means for moving said knife radially when said head is in said drum, power means for reciprocating said head and a clutch between said power means and said head adapted to be thrown out only when said head is out of said drum.

16. A rotary cutter including a rotary head, a slide to which said head is yieldingly connected, means for reciprocating said slide, a fixed abutment, an abutting member movable with the head, a knife in said head, and means for radially moving said knife, said means including an element rigidly connected to said slide whereby initial movement of the slide in one direction will shift said head and said element as a unit and, until the abutting member engages said abutment, continued movement of the slide shift said element relatively to said head to move said knife radially thereof.

HORACE D. STEVENS.